(12) United States Patent
Osoekawa et al.

(10) Patent No.: US 11,486,866 B2
(45) Date of Patent: Nov. 1, 2022

(54) WAVEFORM ANALYZER (71) Applicant: SHIMADZU CORPORATION, Kyoto (JP)

(72) Inventors: Takeshi Osoekawa, Ohta (JP); Yusuke Hida, Atsugi (JP); Yuzi Kanazawa, Setagaya (JP); Shinji Kanazawa, Kyoto (JP); Yohei Yamada, Kyoto (JP); Hiroyuki Yasuda, Kyoto (JP); Akihiro Kunisawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 360 days.

(21) Appl. No.: 16/760,549

(22) PCT Filed: Nov. 9, 2017

(86) PCT No.: PCT/JP2017/040487
§ 371 (c)(1),
(2) Date: Apr. 30, 2020

(87) PCT Pub. No.: WO2019/092837
PCT Pub. Date: May 16, 2019

(65) Prior Publication Data
US 2020/0292509 A1 Sep. 17, 2020

(51) Int. Cl.
G01N 30/86 (2006.01)
(52) U.S. Cl.
CPC ..... *G01N 30/8634* (2013.01); *G01N 30/8693* (2013.01)
(58) Field of Classification Search
CPC ........... G01N 30/8634; G01N 30/8637; G01N 30/8693; G01N 30/8631; G01N 30/88
See application file for complete search history.

(56) References Cited

U.S. PATENT DOCUMENTS

2019/0064130 A1 2/2019 Kanazawa et al.
2021/0140938 A1* 5/2021 Washio ................. G06N 99/00

FOREIGN PATENT DOCUMENTS

JP 2009-008582 A 1/2009
WO WO-2017046988 A1 * 3/2017 ............. G01N 15/14
WO 2017/094170 A1 6/2017

OTHER PUBLICATIONS

"Intelligent Waveform-Processing Algorithm for Improving Efficiency of Analytical Task", Oct. 23, 2017, Shimadzu Corporation.
(Continued)

*Primary Examiner* — David E Smith
*Assistant Examiner* — Hsien C Tsai
(74) *Attorney, Agent, or Firm* — Sughrue Mion, PLLC (57) ABSTRACT When chromatogram data for a target sample have been acquired, a peak position estimator determines an estimated result of the position of the starting and/or ending point of a peak as well as the confidence value representing the reliability of the estimation, using a trained model stored in the trained model storage section. Normally, a plurality of estimated results of the starting point and/or ending point of the peak are acquired for one peak. A peak information correction processor identifies a candidate having the highest confidence as a prime candidate, and superposes a plurality of candidates including the prime candidate, with their respective confidence values, on a displayed chromatogram. An operator referring to the confidence values selects a peak which needs close checking or correction, and corrects the starting point and/or ending point of the selected peak, for example, by selecting and indicating a candidate other than the prime candidate.

10 Claims, 6 Drawing Sheets (56) References Cited

OTHER PUBLICATIONS

"Small Start Service Using Deep Learning Technology to Assist Introduction of Predictive Analysis", Wave, May 2017, vol. 21.
Wei Liu et al., "SSD: Single Shot MultiBox Detector", arXiv.org, Dec. 29, 2016.
Takanori Ogata, "SSD: Single Shot MultiBox Detector", ECCV2016.
International Search Report for PCT/JP2017/040487 dated Feb. 2, 2017 [PCT/ISA/210].
Written Opinion for PCT/JP2017/040487 dated Feb. 2, 2017 [PCT/ISA/210].

* cited by examiner

WAVEFORM ANALYZER

CROSS REFERENCE TO RELATED APPLICATIONS

This application is a National Stage of International Application No. PCT/JP2017/040487 filed Nov. 9, 2017.

TECHNICAL FIELD

The present invention relates to a waveform analyzer configured to analyze the waveform of a signal acquired with an analyzing device. For example, the present invention is suitable for an analysis of the waveform of a signal acquired with various analyzing devices, such as a chromatogram waveform acquired with a gas chromatograph (GC), liquid chromatograph (LC) or similar apparatus, a mass-spectrum waveform acquired with a mass spectrometer, an absorption-spectrum waveform acquired with a spectrophotometer or similar apparatus, as well as an X-ray-spectrum waveform acquired with an X-ray analyzer.

BACKGROUND ART

In a gas chromatograph or liquid chromatograph apparatus, a sample containing various components is introduced into a column. While the sample is passing through the column, the various components are separated from each other in the temporal direction. The separated components are detected with a detector located at the exit end of the column. Based on the detection signal acquired with the detector, a chromatogram is created, on which a peak corresponding to a component in the sample appears. Since the point in time where the peak is observed (retention time) corresponds to the kind of component, it is possible to identify the component from the retention time of the peak, i.e. to perform a qualitative analysis. Furthermore, since the height or area of the peak corresponds to the concentration or content of the component, it is possible to determine the concentration or content of the component from the height value or area value of the peak, i.e. to perform a quantitative analysis.

In order to perform a qualitative or quantitative analysis, it is necessary to correctly detect a peak on a chromatogram waveform and determine the starting and ending positions (points in time) of the peak. An actual chromatogram waveform has such problems as the superposition of various types of noise, fluctuation of the baseline, or overlap of the peaks originating from a plurality of kinds of components. Therefore, it is difficult to correctly detect a peak from a chromatogram waveform. As for the peak detection methods based on chromatogram waveforms, various algorithms have been proposed to date and put to practical use (for example, see Patent Literature 1 or 2).

In a conventionally and commonly used peak detection algorithm, the height value or area value of a peak on an actual chromatogram waveform is calculated after the waveform processing which includes the steps of removing noise (e.g. smoothing), detecting the peak position, estimating the baseline, detecting the starting and ending points of the peak, as well as separating the overlapping peaks. In some algorithms, the estimation of the baseline as well as the detection of the starting and ending points of the peak are performed before the detection of the peak position. In any case, the conventionally and commonly used peak detection algorithm requires an operator (i.e. a person in charge of the analysis) to perform a considerable number of tasks; for example, the operator needs to previously set various parameters, manually indicate the starting point and/or ending point of a peak observed on a chromatogram waveform on a display screen, or select a baseline which the operator considers to be suitable for separating the overlapping peaks. Furthermore, since it is from the start difficult to apply a single specific algorithm to chromatogram waveforms which vary in baseline shape or peak shape, the operator also needs to select an algorithm to be used from a plurality of peak detection algorithms prepared beforehand.

Such tasks are considerably burdensome for the operator and significantly hinder an improvement of the efficiency of the analytical task. Furthermore, since the analytical task requires a certain amount of skill and experience, only a limited group of individuals can take charge of the task. A variation in judgment depending on the operator is also inevitable. There is also room for an intentional operation by an operator. These factors make it difficult to ensure the accuracy, reproducibility or reliability of the analysis result.

Algorithms for automatically detecting the starting point and/or ending point of a peak have also been developed to decrease the burden of the work performed by the operator (for example, see Non Patent Literature 1). However, those algorithms still rely on the operator performing a considerable number of tasks. A further decrease in the burden on the operator has been demanded.

In some cases, the detection result obtained by the automatic peak detection using such an algorithm may be inappropriate. Therefore, it is practically indispensable for the operator to perform the task of visually checking the starting point and/or ending point of the automatically detected peak on the display screen and correcting those points as needed. In a simultaneous multi-component analysis, a chromatogram waveform may possibly include more than ten thousand peaks. In such a case, the task of visually checking and manually correcting the starting and ending points of all peaks requires an enormous amount of time. Therefore, even in the case where the peak detection is automatically performed, it is important to simplify the task of checking and correcting the detection result to reduce the work burden.

CITATION LIST

Patent Literature

Non Patent Literature 1: "Interijento Na Hakei Shori Arugorizumu De Kaiseki Gyoumu Wo Kouritsuka (Intelligent Waveform-Processing Algorithm for Improving Efficiency of Analytical Task)", [online], [accessed on Oct. 23, 2017], Shimadzu Corporation, the Internet Non Patent Literature 2: "Diipu Raaningu Gijutsu Wo Katsuyou Shita Sumooru Sutaato Saabisu De Yosoku Bunseki Dounyuu Wo Shien (Small Start Service Using Deep Learning Technology to Assist Introduction of Predictive Analysis)", Wave 2017.5, vol. 21, [online], [accessed on Oct. 23, 2017], Toshiba Information Systems (Japan) Corporation, the Internet Non Patent Literature 3: Wei Liu and six other authors, "SSD: Single Shot Multibox Detector", [online], [accessed on Oct. 23, 2017], arXiv.org, the Internet Non Patent Literature 4: Takanori Ogata, "SSD: Single Shot MultiBox Detector (ECCV2016)", [online], [accessed on Oct. 24, 2017], slideshare, the Internet

SUMMARY OF INVENTION

Technical Problem

The present invention has been developed to solve the previously described problem. Its objective is to provide a waveform analyzer which allows an operator to easily and efficiently check peak information (such as the starting and ending points) of a peak detected by a peak detection process as well as correct the peak information as needed to output the peak detection result with a high level of accuracy.

Solution to Problem

The present invention developed for solving the previously described problem is a waveform analyzer configured to analyze a signal waveform based on a signal sequence acquired by performing a predetermined analysis on a sample, so as to determine information concerning a peak on the signal waveform, the waveform analyzer including:

a) a peak detector configured to estimate peak information including at least the position of the starting point or position of the ending point of one or more peaks appearing on a signal waveform related to a target sample, using a trained model previously constructed by machine learning using a plurality of signal waveforms % hose starting points and ending points are known, and to determine confidence information which is an index value indicating the reliability of the estimation;

b) a display processor configured to display, on a screen of a display section, one or more pieces of peak information acquired for one peak by the peak detector, along with the signal waveform concerning the target sample, with each piece of peak information related to the corresponding confidence information: and c) a peak information corrector for correcting the peak information displayed on the screen of the display section by the display processor.

The "predetermined analysis" in the present invention is, for example, a chromatographic analysis (e.g. liquid chromatography or gas chromatography), mass spectrometry, ion mobility spectrometry, optical spectrometry (e.g. absorption spectrometry or fluorescence spectrometry), or X-ray analysis. The "signal waveform based on a signal sequence acquired by performing" such an analysis is a chromatogram waveform, spectrum waveform or the like showing a change in signal intensity with respect to a specific variable, such as time, mass-to-charge ratio, ion mobility, wavelength, or energy.

In the waveform analyzer according to the present invention, the peak detector is provided with a trained model constructed beforehand through machine learning using a plurality of signal waveforms (normally, a considerable number of signal waveforms) in which the accurate starting and ending points of the peak are previously known. Upon receiving a signal sequence acquired by analyzing a target sample, the peak detector estimates the position of the starting point and/or ending point of one or more peaks which appear on the signal waveform, from the signal sequence or a signal waveform determined from the signal sequence, using the trained model, and calculates the confidence information which is a measure of the reliability of the estimation. The machine learning used in the present invention is not limited to any specific technique, inclusive of the deep learning which is categorized into machine learning in a broad sense.

Next, the display processor relates the estimated peak information as a candidate of the correct information to the confidence information, and displays it on the screen of the display section along with the signal waveform acquired for the target sample. An operator (user) visually checks the signal waveform as well as the candidates of the peak information and the related confidence information on the display screen, and corrects the peak information through the peak information corrector only when necessary. This makes it possible to reduce the amount of manual work, for example, by omitting the checking task for a peak or peaks for which peak-information candidates having sufficiently high values of confidence information have been found, thereby requiring the operator to only check the peak waveform on the signal waveform for a peak for which only peak-information candidates having comparatively low values of confidence information have been found, and manually indicate the starting point and/or ending point of the peak as needed.

In the present invention, there are various forms that can be adopted for the display by the display processor as well as the instruction on the correction by the peak information corrector and the correcting operations according to the instruction.

Specifically, as one mode of the present invention, the display processor may be configured to display, as a prime candidate, one of the plurality of pieces of peak information acquired for one peak on the signal waveform, in such a manner that the prime candidate is distinguishable from other pieces of peak information which are other candidates: and the peak information corrector may include an indicating section which allows a user to select and indicate a candidate different from the prime candidate, the peak information corrector configured to replace the prime candidate with the candidate selected and indicated by the indicating section.

For example, a pointing device which allows a user to perform a clicking operation on characters, symbols or the like displayed on the screen can be used as the indicating section.

In this mode, the display processor may be configured to identify, as the prime candidate, a piece of peak information having the largest value of the confidence information among the plurality of pieces of peak information acquired for one peak, and display the identified peak information along with at least one more candidate which is a piece of peak information having the second largest value of the confidence information.

According to this mode, the operator only needs to perform an operation for selecting and indicating another candidate when it is necessary to correct the peak information chosen as the prime candidate. Therefore, the correcting operation is simple, and the operator can efficiently correct the peak information.

In the previously described mode, the display processor may be configured to treat, as a probability, a plurality of pieces of confidence information corresponding to the plurality of pieces of peak information acquired for one peak, determine a confidence distribution showing a distribution of the probability with respect to the position of the starting point and/or ending point of the peak included in the plurality of pieces of peak information, and determine the prime candidate based on the confidence distribution.

In this case, the confidence distribution does not always have a local maximum appearing at the position of the starting point and/or ending point of a peak included in the piece of peak information having the largest value of the confidence information among the plurality of pieces of peak information; the local maximum of the confidence distribution may possibly appear at a position slightly displaced from the position of the starting point and/or ending point of the peak. It is most likely that the position at which the local maximum appears is more appropriate as the starting point or ending point of the peak.

Accordingly, in the previously described configuration, a piece of peak information including the starting point and/or ending point of a peak corresponding to a position at which the confidence information reaches a local maximum value within the vicinity of the position of the starting point and/or ending point of the peak included in the piece of peak information having the largest value of the confidence information in the confidence distribution may be identified and chosen as the prime candidate.

According to this configuration, a piece of peak information including the starting point and/or ending point of a peak which is probabilistically more reliable can be presented to the operator as the prime candidate, as compared to the case where the piece of peak information which simply has the largest value of the confidence information among the plurality of pieces of peak information is presented as the prime candidate.

In the previously described configuration, if there are a plurality of convex portions in the confidence distribution, a plurality of pieces of peak information which respectively include the starting points and/or ending points of the peaks corresponding to a predetermined number of top-ranked local maxima among the local maxima of the convex portions may be chosen as candidates.

As another mode of the present invention, the display processor may be configured to select a piece of peak information from a plurality of pieces of peak information acquired for one peak, and display the selected peak information, where the selected peak information satisfies the condition that the difference between the value of the confidence information corresponding to the selected peak information and the value of the confidence information corresponding to a piece of peak information obtained for the same peak based on a signal sequence or signal waveform acquired by an analysis on the same target sample is equal to or less than a predetermined amount.

As still another mode of the present invention, the display processor may be configured to simultaneously display a plurality of sets of peak information and confidence information determined for the same peak based on a plurality of signal sequences or signal waveforms acquired by an analysis performed a plurality of times for the same target sample.

In the case where an analysis is performed a plurality of times for the same sample as in these configurations, a more reliable result can be derived by comparing a plurality of sets of peak information and confidence information respectively estimated based on the signal sequences or signal waveforms acquired by the plurality of analyses, or by calculating the difference between the sets of peak information and confidence information.

As still another mode of the present invention, the display processor may be configured to display, as the prime candidate of the starting point and/or ending point of the peak, a position at which the signal intensity is lowest within the vicinity of the starting point and/or ending point of the peak of a candidate having the highest index value or the prime candidate among a plurality of candidates of the peak information corresponding to one peak.

According to this configuration, for a position of the starting point and/or ending point of the peak estimated by the peak detector, a piece of peak information showing a more appropriate position located within the vicinity of the estimated position can be chosen as the prime candidate in place of the estimated position.

Advantageous Effects of Invention

The waveform analyzer according to the present invention allows a user to efficiently check peak information of automatically detected peaks, such as the starting point, ending point and other items of information, as well as correct the information as needed. In particular, the waveform analyzer displays a piece of probable peak information so that it can be easily distinguished from other pieces of less reliable peak information. This even more helps the user perform visual checking and corrective instructions, thereby reducing the burden on the user in those tasks. The throughput of the waveform analysis can also be improved. Furthermore, for example, in the case of analyzing a signal waveform on which a large number of peaks are observed, the present invention effectively prevents incorrect checking or omission by reducing the number of peaks to be checked by the user.

DESCRIPTION OF EMBODIMENTS

One embodiment of the waveform analyzer according to the present invention is hereinafter described in detail.

Figure 1:
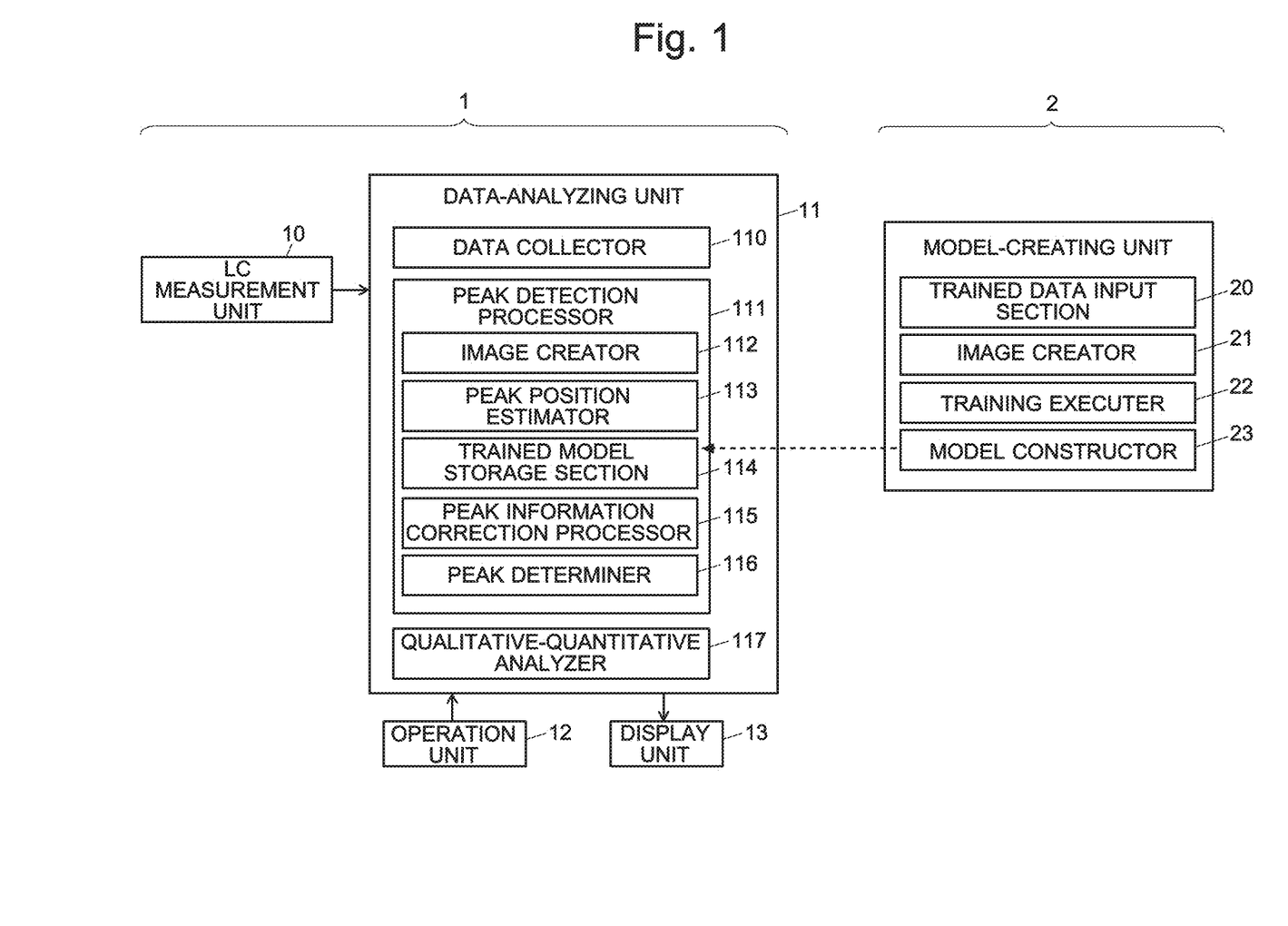
FIG. 1 is a schematic configuration diagram of a liquid chromatograph system using one embodiment of the waveform analyzer according to the present invention and a system for creating a trained model used for the liquid chromatograph system.

FIG. 1 is a schematic configuration diagram of a liquid chromatograph (LC) system using one embodiment of the waveform analyzer according to the present invention and a system for creating a trained model to be used in the LC system.

The LC system 1 includes an LC measurement unit 10, data-analyzing unit 11, operation unit 12 and display unit 13. Though not shown, the LC measurement unit 10 includes a liquid supply pump, injector, column, column oven, detector and other components. The LC measurement unit 10 performs an LC analysis on a given sample and acquires chromatogram data which show the temporal change of the intensity of the signal produced by the detector.

The data-analyzing unit 11 includes a data collector 110, peak detection processor 111, qualitative-quantitative analyzer 117 and other functional blocks. The peak detection processor 111 further includes an image creator 112, peak position estimator 113, trained model storage section 114, peak information correction processor 115, peak determiner 116 and other functional blocks.

In the data-analyzing unit 11, the data collector 110 collects and stores chromatogram data acquired by the LC measurement unit 10. The peak detection processor 11, which corresponds to the peak analyzer according to the present invention, automatically detects a peak on a chromatogram waveform based on the collected chromatogram data, and outputs peak information including the positions (retention times) of the starting and ending points of the detected peak. The qualitative-quantitative analyzer 117 identifies a component corresponding to each peak based on the peak information given from the peak detection processor 111 as well as calculates the peak height value or peak area value and computes the concentration or content of each component from that value.

In FIG. 1, the model-creating unit 2, which is separately provided from the LC system 1, includes a training data input section 20, image creator 21, training executor 22, and model constructor 23 as its functional blocks. A trained model created in this model-creating unit 2 is stored in a storage unit in the data-analyzer unit 11 of the LC system 1 and functions as the trained model storage section 114.

In common situations, the data-analyzing unit 11 is actually a personal computer or more sophisticated workstation on which predetermined software is installed, or a computer system including a high-performance computer connected to the aforementioned computer via communication lines. That is to say, the functions of the blocks included in the data-analyzing unit 11 can be embodied by a processing carried out by executing specific software installed on a single computer or a computer system including a plurality of computers, using various kinds of data stored on the computer or computer system.

The peak detection process carried out in the peak detection processor 111 is hereinafter described in detail.

Simply put, the peak detection processor 111 initially converts a chromatogram waveform (chromatogram curve) into a two-dimensional image and subsequently detects the positions of the starting and ending points of a peak by using the technique of deep learning, which is a technique of machine learning for detecting the category and position of an object present on the image.

[Creation of Trained Model]

Figure 2:
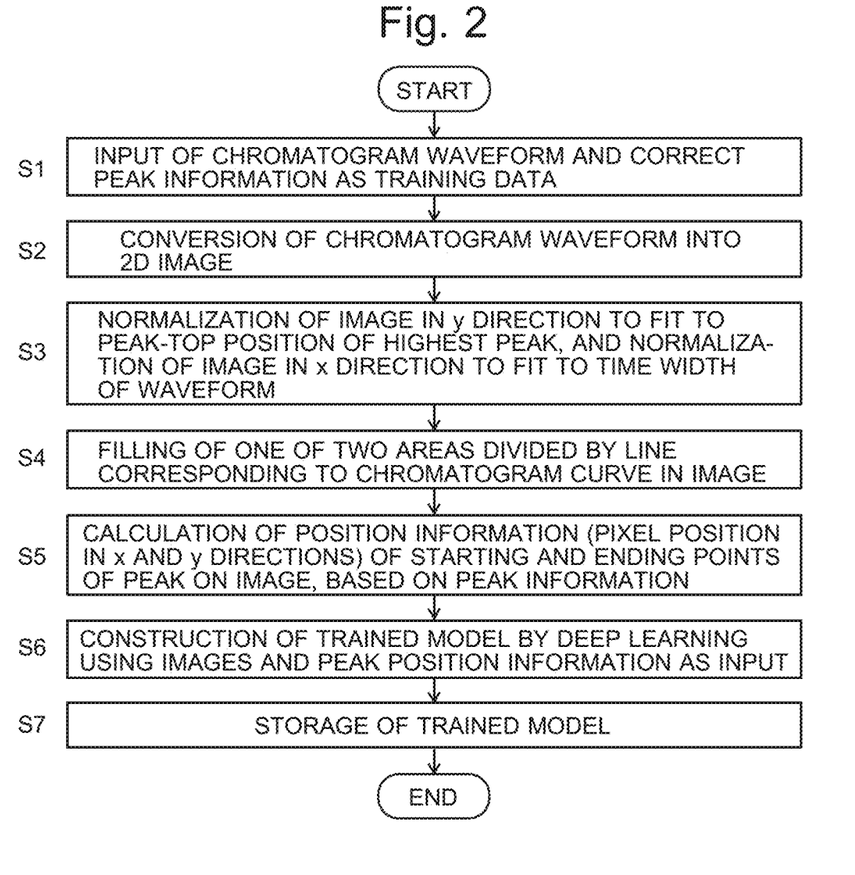
FIG. 2 is a flowchart showing the process flow of the creation of a trained model to be used in the waveform analyzer according to the present embodiment.

As is commonly known, the machine learning method requires a trained model to be constructed beforehand using a large number of sets of training data. As noted earlier, this task of constructing the trained model is not performed in the data-analyzing unit 11 which is a portion of the LC system 1; it is performed in the model-creating unit 2 consisting of a separate computer system, and the obtained result is stored in the trained model storage section 114. The reason for such a configuration is that the task of constructing a trained model normally includes an enormous amount of computation for processing a significant amount of data, which requires a computer that is sufficiently powerful and capable of image processing. FIG. 2 is a flowchart showing the flow of the processing performed in the model-creating unit 2 in creating the trained model.

For the creation of the trained model, it is necessary to prepare a large number and wide variety of chromatogram waveform data, as well as exactly determine the retention times of the starting and ending points of one or peaks which are present on each chromatogram waveform. The "wide variety of chromatogram waveform data" means chromatogram waveforms which contain such factors that possibly occur in a chromatogram waveform in an actual peak detection process, such as the mixture of various kinds of noise, change (drift) of the baseline, overlap of a plurality of peaks, or deformation of the peak shape. The training data input section 20 reads, as the training data, the large number of sets of chromatogram waveform data combined with the exact peak information which includes the starting point and/or ending point of each peak (Step S1).

The image creator 21 creates a chromatogram based on the chromatogram waveform data, which is a time-series signal, and converts the chromatogram waveform (chromatogram curve) showing the change in signal intensity with the passage of time into a two-dimensional image having a predetermined number of pixels (Step S2). As one example, it is hereinafter assumed that the number of pixels in the present embodiment is 512×512. In this image conversion process, the size in the y direction of the waveform is normalized so that the peak top of the peak having the highest signal intensity among the peaks on the chromatogram waveform coincides with the upper side of the rectangular image. The size in the x direction of the waveform is also normalized so that the entirety of the measurement time range of the chromatogram waveform, or a portion of the measurement time range (e.g. a user-specified measurement time range), has a length that equals the length in the x direction (horizontal direction) of the rectangular image (Step S3).

With the chromatogram waveform normalized in the previously described manner, the rectangular image is divided into two areas by the boundary line corresponding to that waveform. Subsequently, one of the two areas formed by the image division is filled with a specified color different from the color of the other area (Step S4). It is preferable to define the color density in multiple tones and determine the color density of each pixel in the vicinity of the line corresponding to the waveform. i.e. the boundary line of the two areas, according to the positional relationship between the boundary line and the pixel. As a specific example, one area may be filled with a 256-tone gray scale of 0 to 255, in which case the portion distant from the boundary line in one area is shown in black, the portion distant from the boundary line in the other area is shown in white, and the pixels in the vicinity of the boundary line are shown in intermediate colors.

Figure 4A:
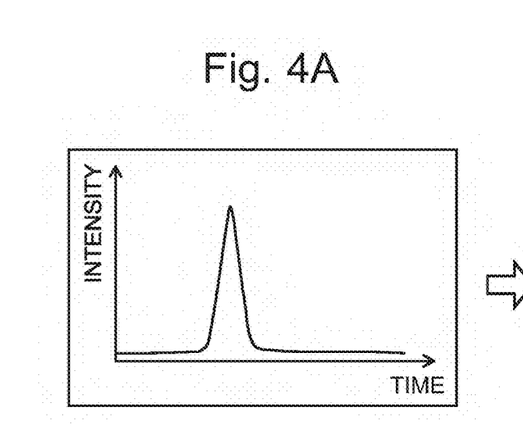
FIGS. 4A and 4B are diagrams showing one example of the creation of an image of a chromatogram waveform in the waveform analyzer according to the present embodiment.
Figure 4B:
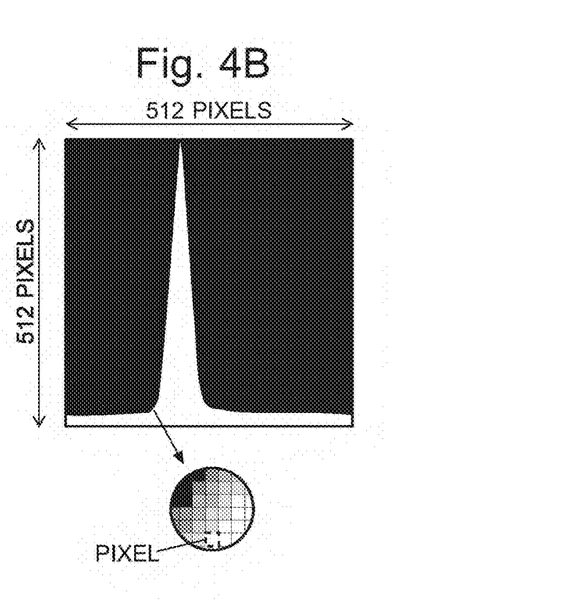

FIG. 4A shows one example of the chromatogram waveform, and FIG. 4B shows a two-dimensional image obtained by performing the image-creating operation on the chromatogram waveform according to Steps S2-S4. The colors of the pixels in an area near the boundary line of the two areas are schematically shown in the lower section of FIG. 4B. In the present example, one of the two areas is entirely filled. This design allows different areas to be distinguished from each other by comparing a micro area (one pixel or a group of pixels) in one area with a micro area in the other area. This is convenient for improving the accuracy of the image recognition in the machine learning algorithm which will be described later. However, depending on the used machine learning algorithm, it may be unnecessary to entirely fill one of the two areas: for example, an image may be used in which only a narrow area extending along the entire boundary line and having a predetermined width from the boundary line is filled. Understandably, the filling operation may be performed using a color scale different from black, or a plurality of colors defined by a color palette. That is to say, the filling only needs to enable the distinction between the micro areas located on one side of the boundary line and those on the other side.

All sets of chromatogram waveform data read in Step S1 are similarly converted into images. As a result of the image-creating operation including the normalization of the chromatogram waveform, the intensity information and time information of the original chromatogram waveform are lost, and an image showing the waveform shape is created. It is naturally possible to perform the image-creating operation for the already read data according to Steps S2-S4 simultaneously with the data-reading operation in Step S1, instead of performing the processing of Steps S2-S4 after reading all sets of data in Step S1.

The image creator 21 converts the peak information combined with the chromatogram waveform data, into the information representing the position information on the image, i.e. the information of the pixel positions in the x and y directions, according to the normalization in the x and y directions in the previously described image-creating operation, i.e. the elongation and contraction of the chromatogram waveform (Step S5).

Next, the training executor 22 carries out machine learning using a large number of images created in the previously described manner from the chromatogram waveforms serving as the training data. Based on the result of the training, the model constructor 23 constructs a trained model to be used for estimating the starting and ending points of a peak on a chromatogram waveform. As is commonly known, there are various algorithms for the machine learning. In the present embodiment, deep learning is used, which is one of the general object detection algorithms used in image recognition. More specifically, Single Short Multibox Detector (SSD) is used, which is particularly efficient in image recognition (Step S6).

SSD is one of the techniques which employ convolutional neural network (CNN), which is most commonly used in the area of deep learning. At present, SSD is an algorithm which can achieve the fastest speed and highest accuracy of recognition. SSD has been proposed by Liu Wei et al, in Non Patent Literature 3. Detailed descriptions of the algorithm are available in Non Patent Literature 3 or 4 or other related documents. Accordingly, the following description only deals with the characteristic points in the present embodiment.

A normal SSD method uses a feature map extracted by CNN in order to estimate a section within the two-dimensional image where an object is present. A variety of feature maps with various sizes (pixel numbers) are used by gradually convoluting the original feature map. By this technique, object-area candidates with various sizes can be detected. On the other hand, the object to be detected in the present embodiment is the positions of the starting and ending points of a peak in the x direction. Therefore, the algorithm has been modified so as to detect the presence of the starting and ending points of a peak within each of the sections which vary in size in the x direction.

Figure 5:
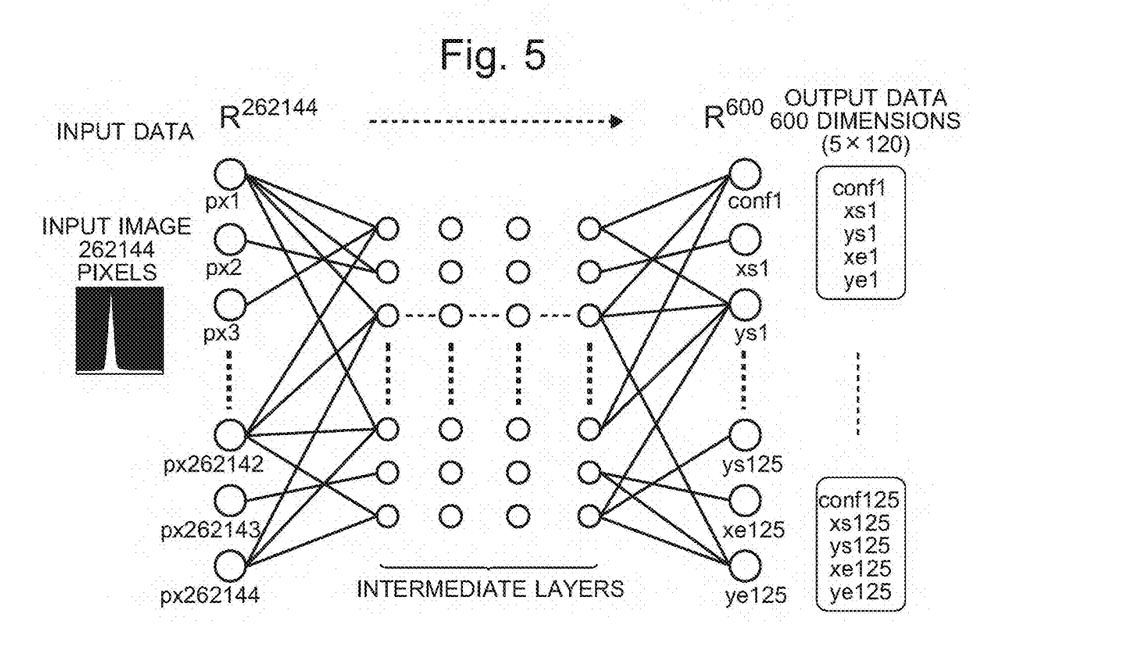
FIG. 5 is a model diagram showing a trained model using a neural network, to be used in the waveform analyzer according to the present embodiment.
Figure 6:
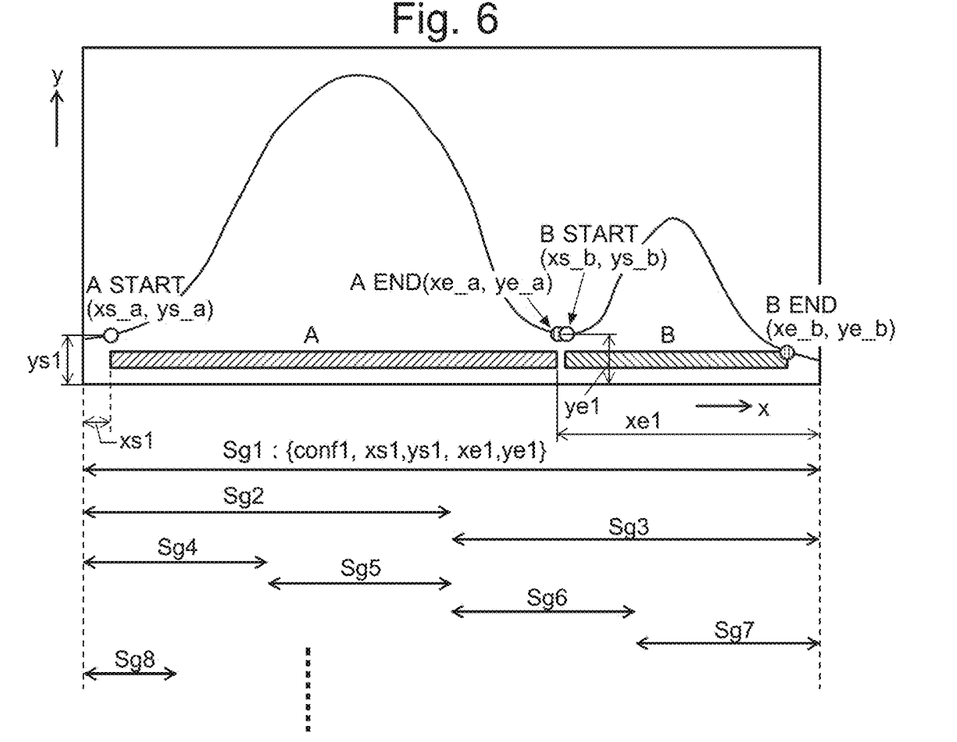
FIG. 6 is a model diagram for explaining the process of creating a trained model to be used in the waveform analyzer according to the present embodiment.

FIG. 5 is a model diagram showing a trained model using a neural network, to be used in the present embodiment. FIG. 6 is a model diagram for explaining the process of creating a trained model. As shown in FIG. 6, in the present example, a segment having a window whose width equals the entire length in x the direction of the image created through the processing of Steps S2-S4 is initially defined as "segment Sg1". The window of this segment Sg1 is subsequently divided into two sections to define segments Sg2 and Sg3 whose window width is equal to one half of the first window. Then, each of the windows of segments Sg2 and Sg3 is similarly divided into two sections to define four segments Sg4, Sg5, Sg6 and Sg7 whose window width is equal to one quarter of the original window. By repeating such operations, a total of 120 segments Sg1-Sg120 are defined. Each segment forms a unit for extracting a feature map by CNN. Based on the images prepared as the training data, the peak range defined by the starting and ending points of the peak is learned for each unit.

In the neural network in the present training model, as shown in FIG. 5, the pixel values (in the present embodiment, gray-scale values within a range of 0 to 255) of the pixels in the 512×512 pixel image are inputted to the 262,114 nodes provided in the input layer, respectively. In FIG. 5, pxn indicates the n-th pixel in one image. In the case of a colored image or an image composed of multiple colors, for example, the pixel values of the three primary colors are inputted for each pixel. Therefore, for example, the number of nodes of the input layer is increased by three times.

In the training executor 22, a network having a layered structure consisting of a large number of intermediate layers is trained by deep learning for the aforementioned input based on a large number of images, and numerical information is outputted from each of the 600 nodes provided in the ultimate output layer. The information outputted from the 600 nodes is five-dimensional information calculated for each of the 120 segments Sg1-Sg120, including the following elements: confidence of the peak detection, confn; offset in the x direction from the left end of the window of the segment to the starting point of the peak, xsn; offset in the y direction from the lower end of the input image to the starting point of the peak, ysn: offset in the x direction from the right end of the window of the segment to the ending point of the peak, xen: and offset in the y direction from the lower end of the input image to the ending point of the peak, yen. In FIG. 6, the five-dimensional information for the first segment Sg1 is expressed as {conf1, xs1, ys1, xe1, ye1}. In the present case, the confidence of the peak detection is defined as the length of the overlap of the peak range and the window. The confidence value ranges from 0 to 1.

In the example of FIG. 6, there are two peaks on the chromatogram waveform. The pixel position of the starting point of the first peak is (xs_a, ys_a), and that of the ending point is (xe_a, ye_a). The peak range is labeled as "A". As for the second peak, the pixel position of the starting point is (xs_b, ys_b), and that of the ending point is (xe_b, ye_b). The peak range is labeled as "B". In this case, xs1, ys1, xe1 and ye1 in segment Sg1 is as shown in FIG. 6. The value of "conf" is a value corresponding to the overlap of the window width of Sg1 and the peak range A. As noted earlier, the pixel positions of the starting point and/or ending point of the peak as well as the peak range in the training data are previously known. The model is constructed by repeatedly calculating the network weights in each intermediate layer through the training so that the matching with the correct values is maximally achieved for the large number of sets of training data.

The model constructor 23 temporarily stores the trained model obtained by performing the deep learning using the large number of sets of training data (Step S7). The trained model created in the previously described manner in the model-creating unit 2 is transferred, for example, through communication lines and stored in the trained model storage section 114 in the data-analyzing unit 11 in the LC system 1.

[Peak Detection Process for Target Sample]

Figure 3:
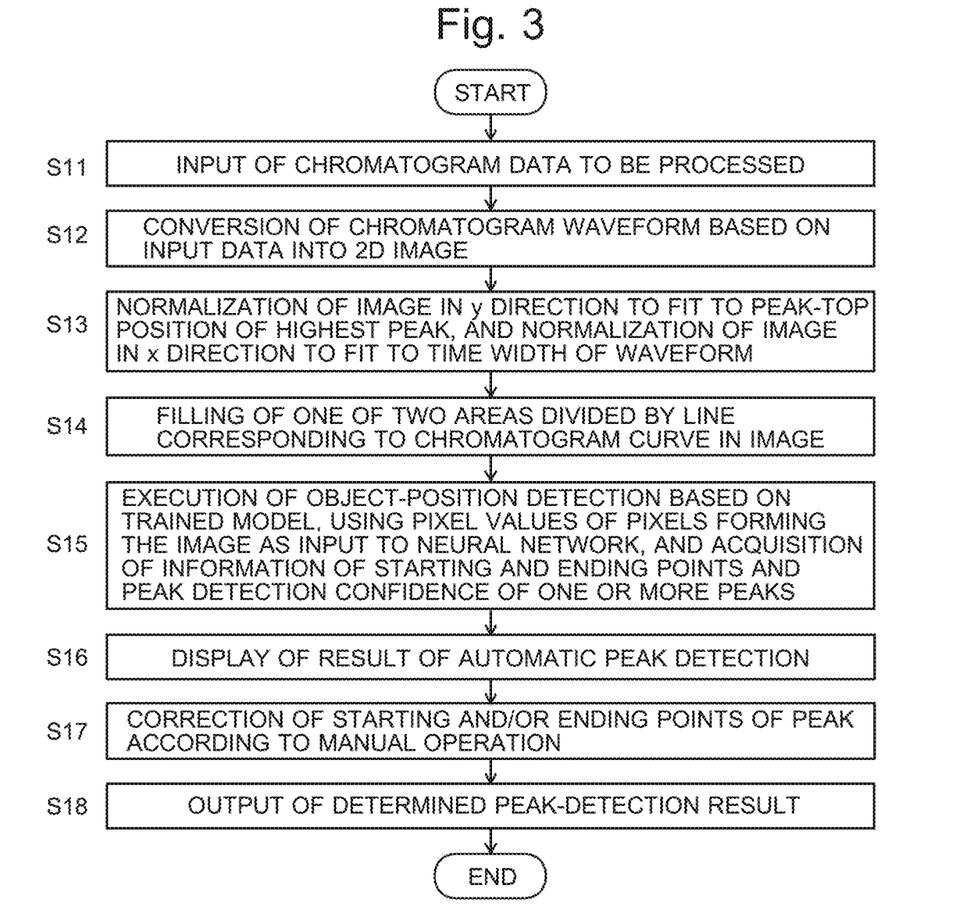
FIG. 3 is a flowchart showing the flow of the peak detection process in the waveform analyzer according to the present embodiment.

Next, the process of detecting a peak on a chromatogram waveform acquired for a target sample carried out in the data-analyzing unit 11 of the LC system 1 is described. FIG. 3 is a flowchart showing the flow of the peak detection process performed in the peak detection processor 111.

Initially, the image creator 112 reads chromatogram waveform data to be processed from the data collector 110 (Step S1). Subsequently, the image creator 112 performs, on the read data, the processing of Steps S12-S14, which is similar to the creation of an image of the chromatogram waveform data according to Steps S2-S4 carried out by the image creator 21 of the model-creating unit 2, to create a 512×512 pixel image including a chromatogram curve.

The peak position estimator 113 applies the trained model stored in the trained model storage section 114 to the pixel values of the pixels of the created image, to obtain the five-dimensional information for each of the 120 segments. In other words, it obtains the information of the pixel positions which are estimated to be the starting and ending points of a peak in the image, along with the peak detection confidence (Step S15).

Figure 7:
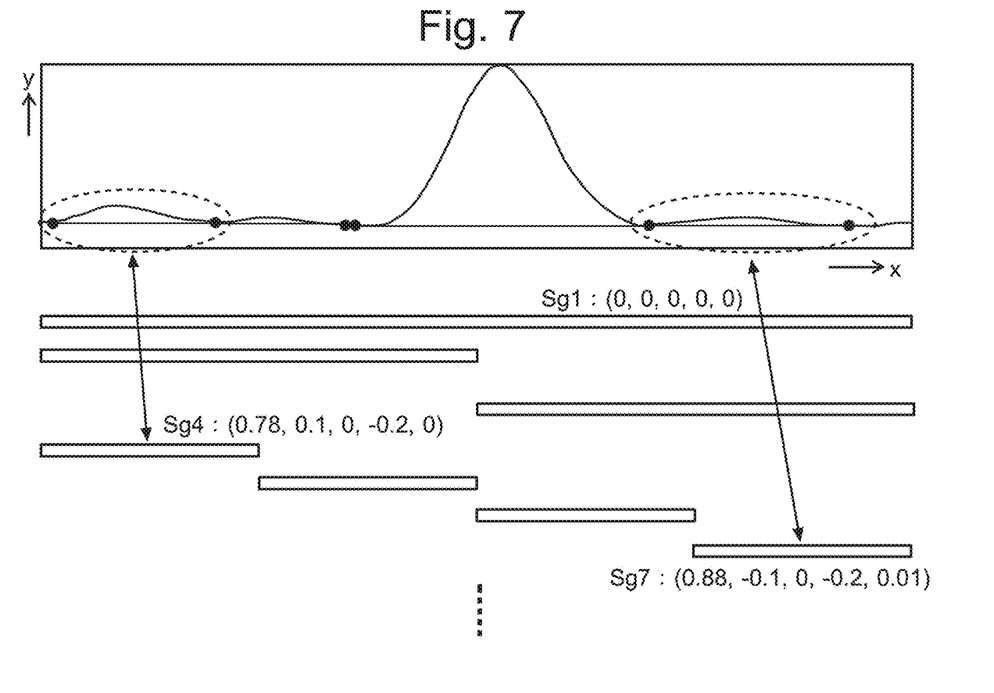
FIG. 7 is a model diagram for explaining the peak detection process using a trained model in the waveform analyzer according to the present embodiment.

FIG. 7 shows one example of the peak detection result. The set of values {confn, xsn, ysn, xen, yen} is obtained for each segment (where n ranges from 1 to 120). Therefore, in many cases, a plurality of segments having {confn, xsn, ysn, xen, yen} with the peak detection confidence having a non-zero value are obtained for one peak. A low value of peak detection confidence confn normally means that the result is unreliable. Accordingly, in the present example, if the calculated value of confn is not greater than a predetermined value (in the present example, 0.5), the five-dimensional peak information is considered to be useless and represented by {0, 0, 0, 0, 0}. It is also possible to use all results without performing such a selection based on the confidence value.

[Correction of Starting and Ending Points of Peak]

As described earlier, it is normally the case that a plurality of positions of the starting point and/or ending point along with the peak detection confidence are obtained for one peak. Therefore, among the plurality of starting points and/or ending points of the peak, the point having the highest peak detection confidence may be estimated to be the correct point, and the information of that starting point and/or ending point of the peak may be outputted as the peak detection result. However, in some cases, the position of the starting point and/or ending point of the peak showing the highest peak detection confidence may not be the correct position. It is also possible that there is no correct position among the plurality of starting points and/or ending points of the peak acquired for one peak. Therefore, in the device according to the present embodiment, the peak information correction processor 115 assists the operator in the checking and correcting tasks as follows:

The peak information correction processor 115 initially treats each of the plurality of starting points and/or ending points of the peak acquired for one peak as a candidate, then removes candidates whose peak detection confidence is not higher than a predetermined threshold (e.g. 0.2) among the plurality of candidates, and selects a predetermined number of candidates (e.g. three) in descending order of peak detection confidence. Subsequently, the peak information correction processor 115 converts the position information on the image of the starting point and/or ending point of the peak shown in the predetermined number of candidates into time information, and displays the result on the screen of the display unit 13 as the automatic peak-detection result, along with the chromatogram waveform over a predetermined time range before and after the peak (Step S16).

The mode of the previously described display may be selected from various possible modes.

Since the operator relies on the peak detection confidence as a guide for selecting one of the candidates, it is preferable to identify the candidate having the highest peak detection confidence as the prime candidate and display it in such a manner that it can be easily and visually distinguished from the other candidates. To this end, the starting point and/or ending point of the peak indicated by each candidate may be represented by a symbol (e.g. circle) in a predetermined color on the chromatogram waveform, with the prime candidate represented by a symbol in a strong color and other candidates by a symbol in a soft color. It is also possible to gradually change the brightness of the color of the symbol in descending order of peak detection confidence. In order to make it easier to distinguish between the starting and ending points of the peak, the starting and ending points may be shown in different colors or by different symbols, such as a circle representing the starting point and a triangle representing the ending point.

Figure 8:
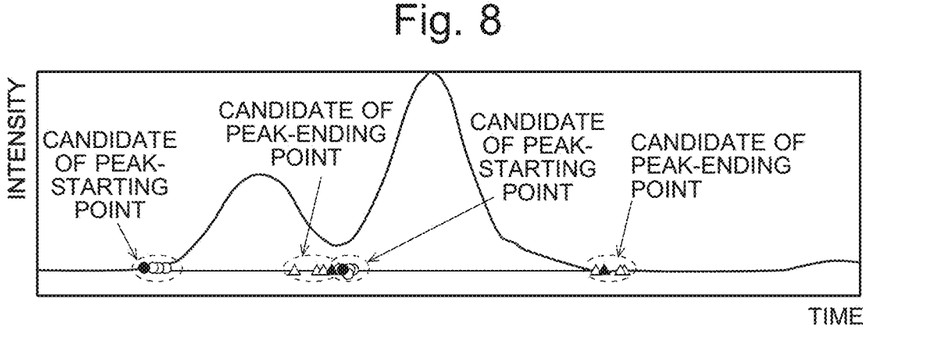
FIG. 8 is a diagram showing an example of the display of the candidates of the starting point and/or ending point of a peak determined by an automatic peak-detecting process in the waveform analyzer according to the present embodiment.

FIG. 8 is an example in which, for each peak, the estimated starting and ending points of the peak are indicated by a circle and triangle, respectively, with the prime candidate indicated by filling those symbols and the other candidates left unfilled. With such a display, the prime candidate can be quickly distinguished from the other candidates.

On the screen of the display unit 13, the operator visually checks the chromatogram waveform as well as the position of the starting point and/or ending point of each peak chosen as the candidates. If the operator considers that the starting point and/or ending point which is not the prime candidate is more appropriate than the starting point and/or ending point which is the prime candidate, the operator selects and indicates the more appropriate starting point and/or ending point, for example, by a clicking operation with a pointing device on or near the symbol of the starting point and/or ending point. The peak information correction processor 115 receives this indication and replaces the prime candidate with the position of the indicated starting point and/or ending point. Thus, the operator can correct the automatic peak-detection result by his/her own judgment and operation (Step S17).

Figure 9:
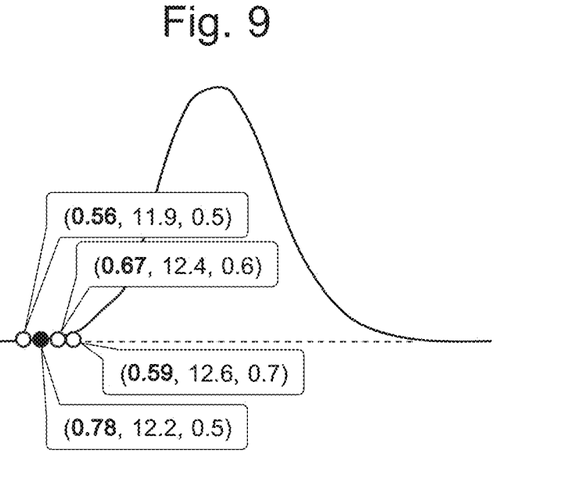
FIG. 9 is a diagram showing an example of the display of the candidates of the starting point and/or ending point of a peak determined by an automatic peak-detecting process in the waveform analyzer according to the present embodiment.

The previously described mode in which the symbols indicating the starting point and/or ending point of the peak are given different colors or other types of information according to the peak detection confidence allows the operator to understand the relationship between the magnitudes of the confidence. However, a more appropriate judgment can be made if the operator can directly check the numerical values of the peak detection confidence. To this end, an annotation box or the like may be put near the chromatogram waveform on the screen to numerically indicate the values of the peak detection confidence of the plurality of candidates. FIG. 9 is one example of such a display. In the present example, the first numerical value in parentheses is the peak detection confidence (ranging from 0 to 1), while the subsequent numerical values are the information of the point in time of the starting point and intensity of the peak. The numerical value of the peak detection confidence, which is the most important information for the comparison, is shown in boldface to make it more noticeable than the other numerical values. Therefore, the operator can quickly check the numerical values of the peak detection confidence and select a more appropriate candidate.

The annotation box as shown in FIG. 9 may be constantly displayed. Alternatively, for example, the annotation box may be displayed only when the cursor on the image is placed close to the chromatogram waveform or symbol indicating the starting point and/or ending point of the peak. The highlighting of the peak detection confidence may be achieved by changing the font color, font size, tilting angle of italic letters or the like instead of showing the numerical value of the peak detection confidence by boldface. In the present case, the annotation box may be configured to allow the operator to select and specify a candidate by performing a clicking operation on the numerical value or appropriate position within the annotation box of the displayed peak detection confidence.

Instead of selecting the final result or determining the prime candidate based on the magnitude of the peak detection confidence, the peak information correction processor 115 may perform the following processing.

If there are a plurality of (practically, a considerable number of) candidates of the starting point and/or ending point of the peak for one peak, the change in peak detection confidence on the time axis can be considered as a confidence distribution and represented by a graph for each of the starting and ending points. The graph may be a line graph, heat map or the like. Suppose that a confidence distribution curve which fits to the plurality of points has been determined. This confidence distribution curve does not always have a local maximum at the point of the highest peak detection confidence among those points: in some cases, the confidence distribution curve has the local maximum at a different point close to the point of the highest peak detection confidence. In that case, the position (time) at which the curve has the local maximum can be considered to be more appropriate as the starting or ending point of the peak. Therefore, it is preferable to choose, as the prime candidate of the starting or ending point of the peak, the position at which the confidence distribution curve has the local maximum. Furthermore, the local maximum value can be chosen as the peak detection confidence corresponding to the prime candidate.

If there are a plurality of convex portions appearing in the confidence distribution curve, a predetermined number of convex portions can be selected in descending order of local maximum value, and the positions corresponding to those convex portions can be chosen as the candidates of the starting point and/or ending point of the peak.

In any case, after appropriately correcting the automatic peak-detection result as needed, the operator issues a commend to determine the peak detection result. In response to the command, the peak determiner 116 determines, as the final peak detection result, the starting and ending points of the peak chosen as the prime candidate at that point in time, and outputs the result (Step S18).

In the data-analyzing unit 11, the qualitative-quantitative analyzer 117 receives the peak detection result. Then, for example, it calculates the peak area value or peak height value of each peak, and computes the concentration or content of the target component by comparing the calculated value with a previously obtained calibration curve. If the component is unknown, the data-analyzing unit 11 identifies a component for each peak based on its retention time.

The task of checking and correcting the starting point and/or ending point of a peak described in the previous embodiment can be further changed as follows:

In the previous description, the device detects peaks from a chromatogram waveform acquired by analyzing one target sample, using a trained model. Repeating an analysis on the same sample yields a plurality of chromatogram waveforms for that sample, in which case a plurality of automatic peak-detection results respectively obtained for those waveforms can be combined with each other.

Specifically, a plurality of peak-detection-confidence values obtained for the same starting point and/or ending point of a peak derived from the same component in the same sample may be simultaneously displayed. This allows the operator to select a candidate based on the judgment that a candidate for which the plurality of peak-detection-confidence values are all high is highly reliable. It is also possible to calculate the variation of the plurality of peak-detection-confidence values obtained for the same starting point and/or ending point of the same peak. If the variation is not less than a predetermined threshold, the candidate in question can be considered as unreliable and be excluded. By using such information obtained by performing an analysis multiple times for the same sample, the peak detection accuracy can be even more improved, and a high level of reliability of the quantitative determination can be achieved.

Figure 10:
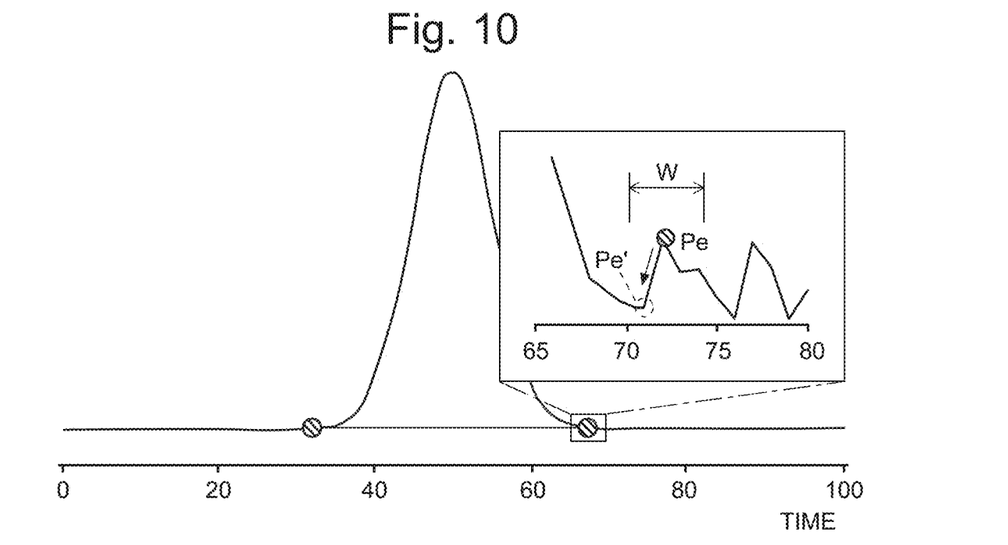
FIG. 10 is a diagram showing an example of the task of correcting the ending point of a peak automatically detected in the waveform analyzer according to the present embodiment.

The correction of the position of the starting point and/or ending point of a peak may be automatically performed, instead of being performed according to a manual operation. Specifically, the starting point or ending point of a peak can be automatically corrected to a position at which the signal intensity is lowest within a specific time range centered on the starting point or ending point of the peak indicated by a candidate. FIG. 10 is an example in which the ending point Pe of a peak chosen as a candidate is automatically changed to Pe' at which the intensity is lowest within a predetermined time width W defined for the ending point Pe.

The time width W may be a previously specified fixed range of time or be determined by a function of the peak width (e.g. a range which equals $\frac{1}{10}=\pm\frac{1}{20}$ of the peak width). In place of the point at which the signal intensity is lowest within the time width W, a different value may be chosen, such as an average value of the chromatogram waveform within the time width W, or an intermediate value derived from the highest and lowest values within the time width W. The baseline value or other values calculated from the chromatogram data within the time width W by an appropriate method different from the present algorithm may also be used.

In the previously described embodiment. SSD, which is a technique of deep learning, is used for creating a trained model. The algorithms that can be used in the present invention are not limited to SSD. A machine learning technique that is not a type of deep learning may also be used.

The previously described embodiment is an example in which the waveform analyzer according to the present invention is applied to a chromatogram waveform acquired by a chromatograph apparatus, which is an LC or GC, to perform the peak detection. The present invention can also be used for the processing of signal waveforms acquired with various kinds of analyzing devices other than chromatograph apparatuses. For example, it is evident that the present invention can also be used for the detection of a peak appearing on other types of waveforms, such as a mass spectrum acquired with a mass spectrometer, optical spectrum acquired with various spectral analyzers (e.g. absorption spectrophotometer or fluorescence spectrophotometer), ion mobility spectrum acquired with an ion mobility spectrometer, or X-ray spectrum acquired with an X-ray analyzer.

Furthermore, it is evident that any change, modification or addition appropriately made within the spirit of the present invention in any aspect other than those already described will also fall within the scope of claims of the present application.

REFERENCE SIGNS LIST

1 . . . Liquid Chromatograph (LC) System
10 . . . LC Measurement Unit
11 . . . Data-Analyzing Unit
110 . . . Data Collector
111 . . . Peak Detection Processor
112 . . . Image Creator
113 . . . Peak Position Estimator
114 . . . Model Storage Section
115 . . . Peak Information Correction Processor
116 . . . Peak Determiner
117 . . . Qualitative-Quantitative Analyzer
12 . . . Operation Unit
13 . . . Display Unit
2 . . . Model-Creating Unit
20 . . . Training Data Input Section
21 . . . Image Creator
22 . . . Training Executor
23 . . . Model Constructor

The invention claimed is:

1. A waveform analyzer configured to analyze a signal waveform based on a signal sequence acquired by performing a predetermined analysis on a sample, so as to determine information concerning a peak on the signal waveform, the waveform analyzer comprising:
a peak detector configured to estimate peak information including at least a position of a starting point or position of an ending point of one or more peaks appearing on a signal waveform related to a target sample, using a trained model previously constructed by machine learning using a plurality of signal waveforms whose starting points and ending points are known, and to determine confidence information which is an index value indicating a reliability of estimation; and
a display processor configured to display, on a screen of a display section, one or more pieces of peak information acquired for one peak by the peak detector, along with the signal waveform concerning the target sample, with each piece of peak information related to the corresponding confidence information.

2. The waveform analyzer according to claim 1, further comprising:
a peak information corrector for correcting the peak information displayed on the screen of the display section by the display processor.

3. The waveform analyzer according to claim 2, wherein:
the display processor is configured to display, as a prime candidate, one of a plurality of pieces of peak information acquired for one peak on the signal waveform, in such a manner that the prime candidate is distinguishable from other pieces of peak information which are other candidates; and
the peak information corrector includes an indicating section which allows a user to select and indicate a candidate different from the prime candidate, the peak information corrector configured to replace the prime candidate with the candidate selected and indicated by the indicating section.

4. The waveform analyzer according to claim 3, wherein:
the display processor is configured to identify, as the prime candidate, a piece of peak information having a largest value of the confidence information among the plurality of pieces of peak information acquired for one peak, and display the identified peak information along with at least one more candidate which is a piece of peak information having a second largest value of the confidence information.

5. The waveform analyzer according to claim 3, wherein:
the display processor is configured to treat, as a probability, a plurality of pieces of confidence information corresponding to the plurality of pieces of peak information acquired for one peak, determine a confidence distribution showing a distribution of the probability with respect to the position of the starting point and/or ending point of the peak included in the plurality of pieces of peak information, and determine the prime candidate based on the confidence distribution.

6. The waveform analyzer according to claim 5, wherein:
the display processor is configured to identify a piece of peak information including the starting point and/or ending point of a peak corresponding to a position at which the confidence information reaches a local maximum value within a vicinity of the position of the starting point and/or ending point of the peak included in a piece of peak information having a largest value of the confidence information in the confidence distribution, and to choose the identified piece of peak information as the prime candidate.

7. The waveform analyzer according to claim 5, wherein:
the display processor is configured so that, if there are a plurality of convex portions in the confidence distribution, the display processor chooses, as candidates, a plurality of pieces of peak information which respectively include the starting points and/or ending points of the peaks corresponding to a predetermined number of top-ranked local maxima among local maxima of the convex portions.

8. The waveform analyzer according to claim 1, wherein:
the display processor is configured to select a piece of peak information from a plurality of pieces of peak information acquired for one peak, and display the selected peak information, where the selected peak information satisfies a condition that a difference between a value of the confidence information corresponding to the selected peak information and a value of the confidence information corresponding to a piece of peak information obtained for the same peak based on a signal sequence or signal waveform acquired by an analysis on the same target sample is equal to or less than a predetermined amount.

9. The waveform analyzer according to claim 1, wherein:
the display processor is configured to simultaneously display a plurality of sets of peak information and confidence information determined for the same peak based on a plurality of signal sequences or signal waveforms acquired by an analysis performed a plurality of times for the same target sample.

10. The waveform analyzer according to claim 1, wherein:
the display processor is configured to display, as a prime candidate of the starting point and/or ending point of the peak, a position at which a signal intensity is lowest within the a of the starting point and/or ending point of the peak of a candidate having a highest index value or the prime candidate among a plurality of candidates of the peak information corresponding to one peak.

\* \* \* \* \*